United States Patent
Townsend

(10) Patent No.: US 6,587,286 B1
(45) Date of Patent: Jul. 1, 2003

(54) CIRCULAR PRISM LIGHT CAPACITOR

(76) Inventor: James A. Townsend, 12304 SE. Powell Blvd., Portland, OR (US) 97236

( * ) Notice: Subject to any disclaimer, the term of this patent is extended or adjusted under 35 U.S.C. 154(b) by 0 days.

(21) Appl. No.: 09/384,548

(22) Filed: Aug. 27, 1999

(51) Int. Cl.[7] .......................... G02B 5/04; H01S 3/082; H01S 3/083; G02F 1/13
(52) U.S. Cl. ...................... 359/833; 359/834; 359/837; 372/25; 372/94; 372/97; 372/100; 349/1; 349/114
(58) Field of Search .................. 359/831, 833, 359/834, 835, 836, 837; 372/25, 26, 29, 94, 97, 100; 349/1, 114, 115, 176

(56) References Cited

U.S. PATENT DOCUMENTS

| | | | | |
|---|---|---|---|---|
| 1,788,740 A | * | 1/1931 | Pomeroy | ................... 359/834 |
| 3,456,210 A | * | 7/1969 | Statz et al . | |
| 3,538,453 A | * | 11/1970 | Miller | |
| 3,597,702 A | * | 8/1971 | Orsay et al. | ................. 359/834 |
| 3,624,531 A | * | 11/1971 | Towson | |
| 3,649,931 A | * | 3/1972 | Macek | |
| 3,711,788 A | * | 1/1973 | Forkner | |
| 4,088,964 A | * | 5/1978 | Clow | |
| 4,331,387 A | * | 5/1982 | Wentz | |
| 4,420,836 A | * | 12/1983 | Harper | |
| 4,677,639 A | * | 6/1987 | Sasser | |
| 4,740,986 A | * | 4/1988 | Reeder | ........................ 359/834 |
| 5,148,444 A | * | 9/1992 | Berger | ........................ 372/94 |
| 5,276,548 A | * | 1/1994 | Margaleth | ..................... 372/94 |
| 5,608,744 A | * | 3/1997 | Hovis et al. | ................... 372/97 |
| 5,784,397 A | * | 7/1998 | Kim et al. | |
| 5,973,864 A | * | 10/1999 | Lehmann et al. | ........... 359/834 |

* cited by examiner

Primary Examiner—Ricky D. Shafer
(74) Attorney, Agent, or Firm—Edward L. White

(57) ABSTRACT

The present invention comprises of a circular prism having beveled periphery and center faces cooperating with multiple other prisms to form a light capacitor. The present invention allows a user to collect and hold the light in a storage-type device for use in a concentrated way when desired.

5 Claims, 4 Drawing Sheets

CIRCULAR PRISM LIGHT CAPACITOR

CROSS REFERENCES TO RELATED APPLICATIONS

None.

BACKGROUND OF THE INVENTION a. Field of the Invention

The invention relates to devices for harnessing light energy. More particularly, the invention relates to devices used to store, then release light energy in a burst.

b. Description of the Prior Art

Since caveman times, when man walked out of his cave and felt the warmth of the sun on his face, he has inherently understood that light contains energy. Recently, scientific advances have allowed creation of lasers and other such devices to more effectively harness the power of light.

There are many ways to harness the energy of light: mirrors can be used to reflect light, and prisms can be used to refract or bend light. There are practical applications of the properties of reflection including solar collectors using parabolic mirrors to reflect light onto a concentrated source which is then heated to produce, for example, steam for electric generation. Similarly, there are myriad practical applications of refraction, for example, binoculars used to magnify distant objects.

U.S. Pat. No. 4,691,994 to Afian et al., discloses a method for solar concentrator manufacturing. Afian's device is intended to, for example, receive sunlight concentrated, it then releases a more focused light from an output face. Afian uses a hologram layer to ensure that light entering the trapezoidal prism in this device enters the prism at an angle θ such that it is propagated through the prism via total interval reflection within the prism towards an output face. Thus, a concentrated beam is omitted at the output face. In effect, Afian's device acts like a traditional magnifying glass to concentrate light rays, though it uses a prism and the concept of total internal reflection to accomplish that objective.

A similar device is disclosed by Kuper et al., in U.S. Pat. No. 5,555,329. Kuper discloses a light directing optical structure. Several prisms are provided, each having an aperture, which due to its index of refraction, allows light to escape the waveguide rather than remain confined in the prism due to total internal refraction. The light escaping the waveguide is reflected from a side face of the prism, and redirected in a desired direction. Light emerging from the aperture is of a fairly closely constrained range of angles. The optical structure can receive light along an input edge or along several edges, converting this input, which is not constrained in angles, to a directed, controlled output source.

However, both of the Afian and the Kuper devices are directed at sources of defused light, that is they are not directed at use and manipulation of laser-type light. There is a need for an invention to direct and focus both diffused light and laser-type light.

SUMMARY OF THE INVENTION

In view of the foregoing disadvantages inherent in the known types of the invention which relates to devices for harnessing light energy, it is an object of the invention to provide an apparatus which overcomes the various disadvantages of the prior art.

It is therefore an object of the invention to provide a device to collect and concentrate both diffuse light from sources such as sunlight, incandescent, and flourescent lighting sources, as well as from lasers. More particularly, it is an object of the present invention to provide a circular prism-based system for collecting and storing light in a focused beam for use as such. Essentially, it is an objection of the present invention to provide a light "capacitor."

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

The invention will be better understood and the objects other than those set forth above will become apparent when consideration is given to the following detailed description thereof. Such description makes reference to the annexed drawings wherein.

DETAILED DESCRIPTION OF PREFERRED EMBODIMENTS

Figure 1:
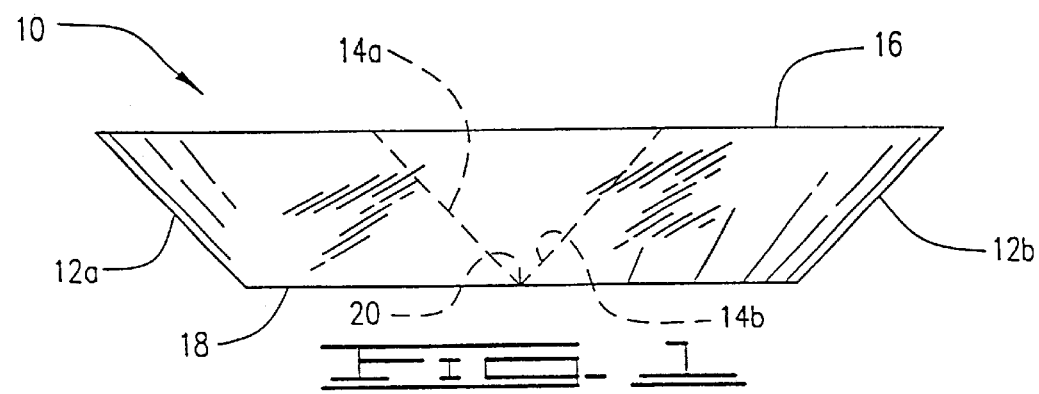
FIG. 1 is a side view of the circular light prism.
Figure 2:
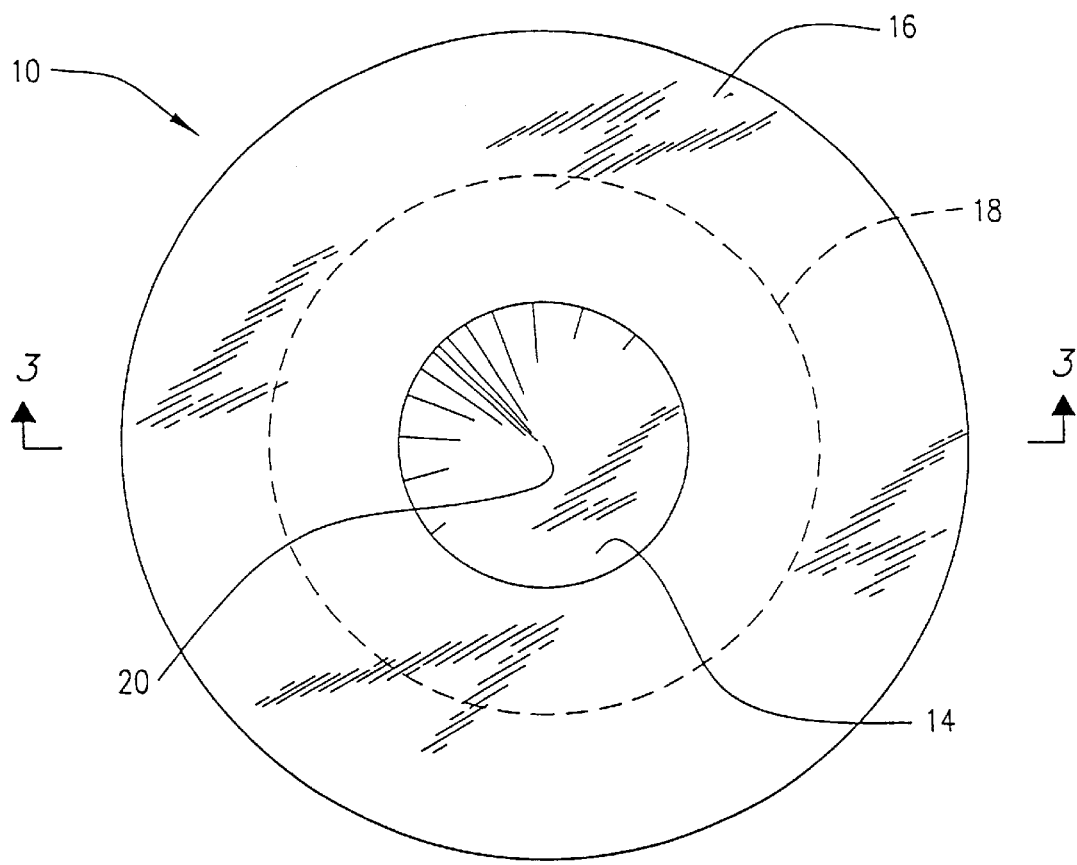
FIG. 2 is a top view of the circular light prism.
Figure 3:
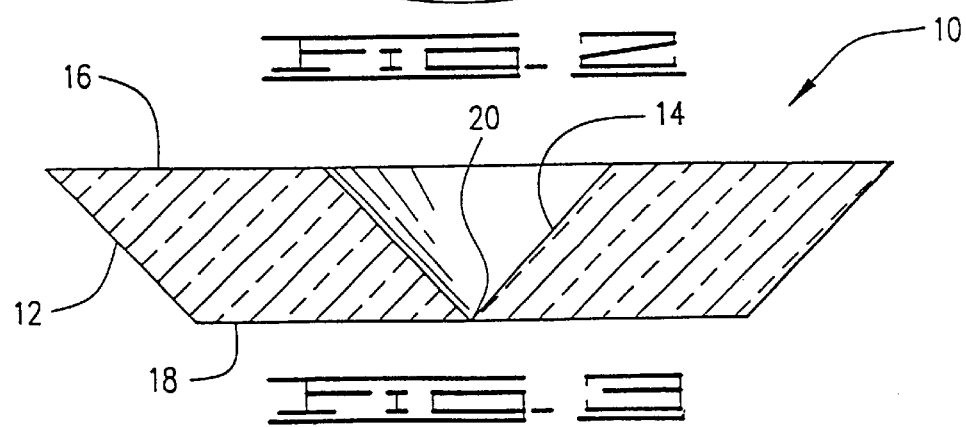
FIG. 3 is a sectional side view along lines 2 2 of FIG. 2.
Figure 4:
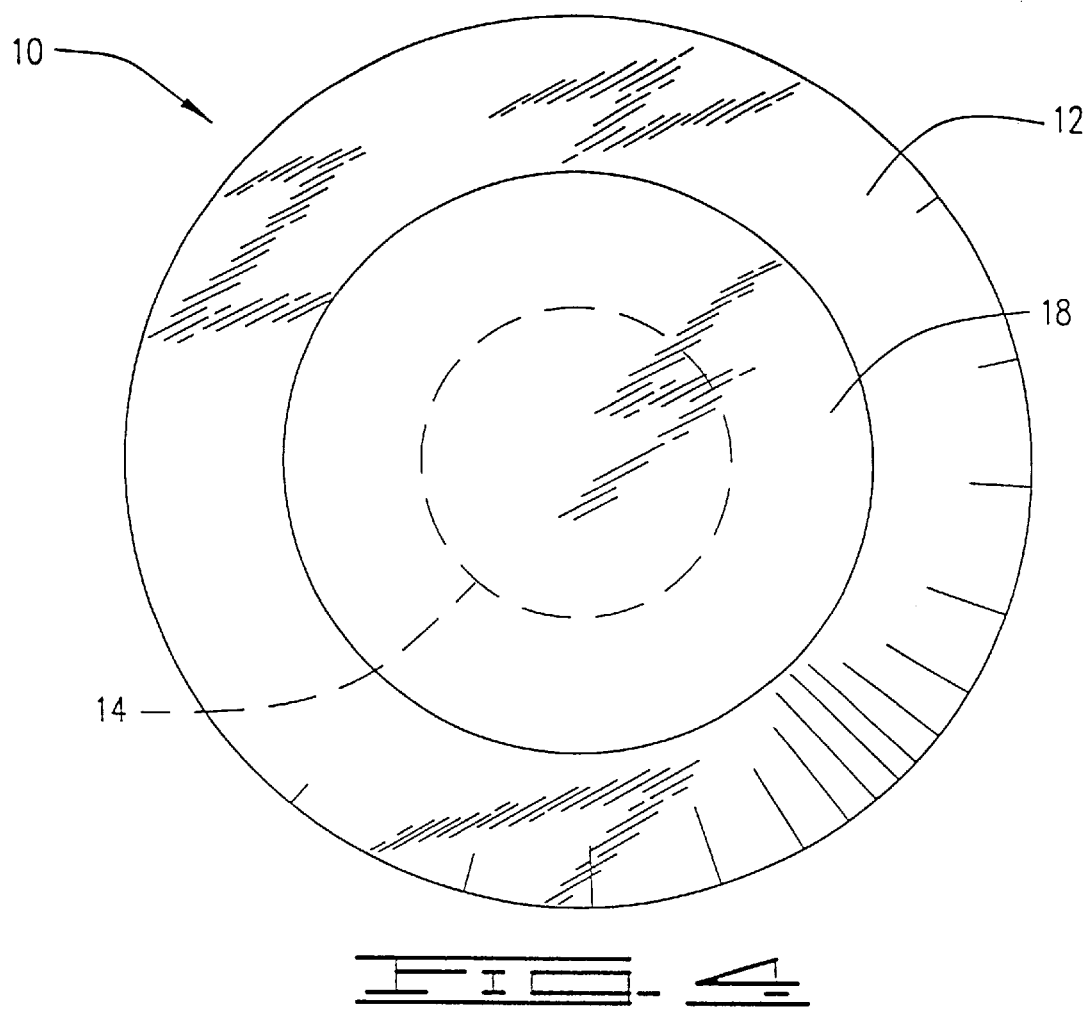
FIG. 4 is a bottom view of the circular light prism.

Referring now to the drawings, where like numerals represent like or parts, as a preferred embodiment, the present invention incorporates a circular prism 10. The circular prism 10 has a beveled periphery face 12 with opposing sides 12a and 12b of the periphery face 12, as shown in FIG. 1 of the drawings. It also incorporates a beveled center face 14. The beveled center face 14 is a conical section cut out of the circular prism 10. The circular prism 10 has an upper surface 16 and a lower surface 18 and a center 20. FIG. 1 is a side view of the circular prism 10. The beveled center face 14 is shown as dashed lines in FIG. 1. In sectional view, FIG. 3, the beveled center face 14 is shown as angled lines at the center of the drawing. FIG. 2, which is a top view of the present invention, highlights the beveled center face 14. FIG. 4, which is a bottom view of the circular prism 10 illustrates the beveled periphery face 12.

Preferably, the circular prism 10 is constructed from fused silica or materials with like optical properties. In some applications, it may be desirable to construct the circular prism 10 of alternative materials such as plastics, glasses, or crystalline materials appropriate to the application. The advantages of plastics are that they are more durable and less brittle than glasses or crystalline materials. However, their optical properties are not as good, and given a large capacitance, they may tend to melt and degrade.

Figure 5:
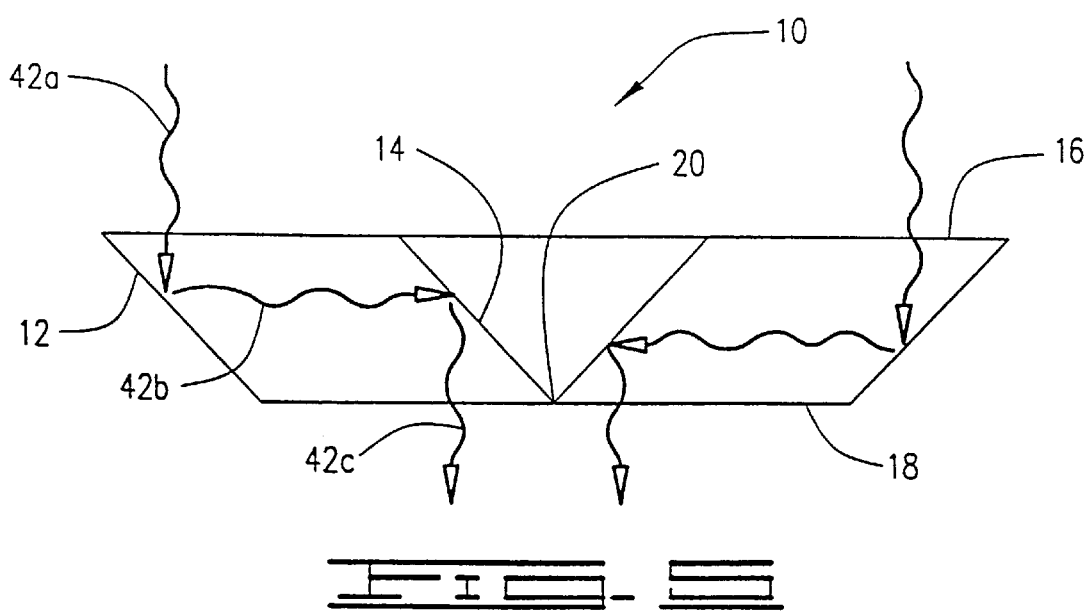
FIG. 5 is a sectional side view, similar to FIG. 3, but showing how light rays entering the circular prism are refracted.

FIG. 5 illustrates the effect of the circular prism 10 on light rays entering. Entering light rays 42a strike the beveled periphery face 12 and are refracted in a direction parallel to the upper surface 16. The light rays 42b next strike the beveled center face 14 and are refracted in a direction perpendicular to the upper surface 16. See light ray 42c.

Figure 6:
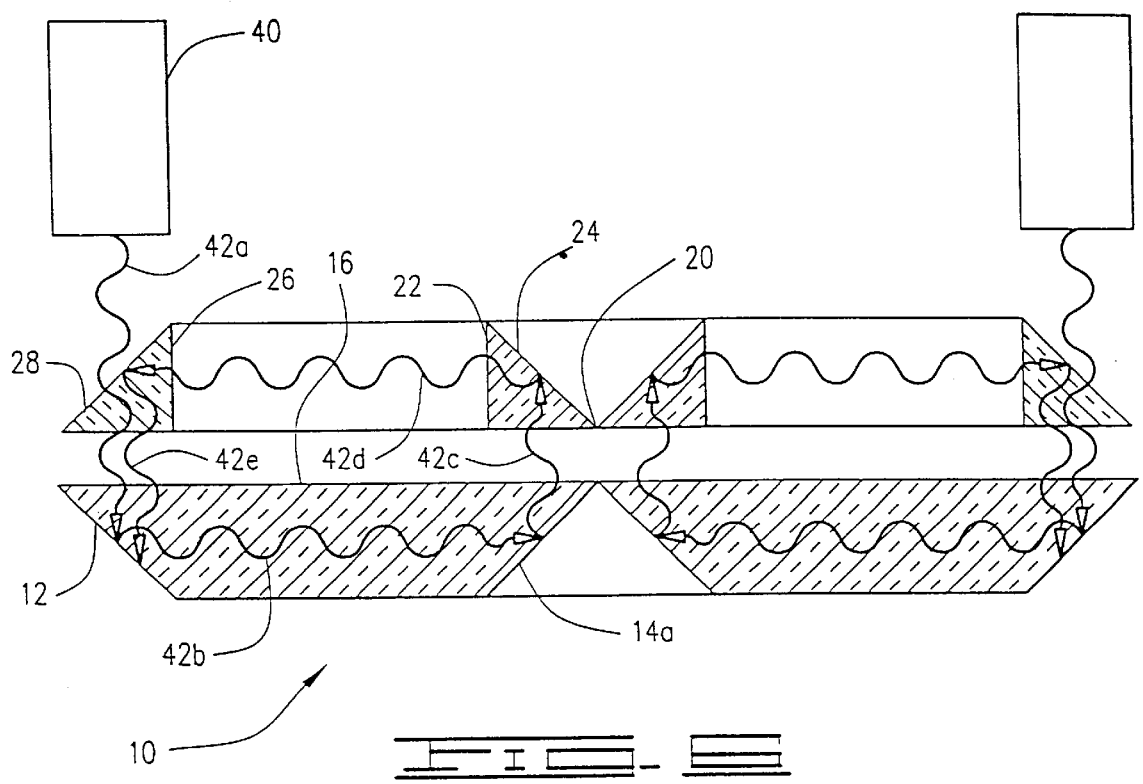
FIG. 6 is a schematic representation of the present invention incorporating several looping prisms in cooperation with the circular prism for providing a light capacitor.
Figure 7:
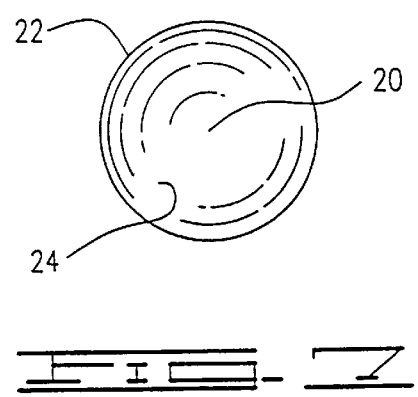
FIG. 7 is a top view of the first looping prism.

FIG. 6 illustrates one embodiment of the present invention. Light rays 42a are admitted from a source, which is shown as a laser 40. The source could also be a diffuse light source such as the sun. They enter the circular prism 10 and are refracted from the beveled periphery face 12 in a direction parallel to the upper surface 16. See light ray 42b. Light ray 42b strikes the beveled center face 14a and is refracted in a direction perpendicular to the upper surface 16. The light ray 42c exits the circular prism 10 through the upper surface 16, enters a first looping prism 22 and is refracted from a first bevel face 24 in a direction parallel to the upper surface 16. Light rays 42d enter a second looping prism 26 and are refracted from a second bevel face 28 in a direction substantially perpendicular to the upper surface 16. Light rays 42e reenter the circular prism 10 and are again refracted from the beveled periphery 12. Thereafter, the light rays continue in the path defined above, to-wit: refraction off of the beveled periphery 12 toward the beveled outer face, thence toward the first looping prism 22 and refracted from the first bevel face toward the second looping prism 26, thence refracted off of the second bevel face 28 the cycle repeating. Preferably, the first looping prism 22 and the second looping prism 26 will be circular. The circular nature of the first looping prism 22 is illustrated in FIG. 7. The first looping prism 22 has a conical section removed therefrom which matches and is a mirror image of the conical section removed from the circular prism 10. The second looping prism 26 has a substantial center portion thereof removed leaving triangular cross section at its periphery. The second looping prism is shown in cross section in FIG. 6. Having both the first looping prism 22 and the second looping prism 26 formed in the shape of a circle allows the entire circumference of the apparatus to be used for trapping light energy.

OPERATION OF APPARATUS

Figure 8:
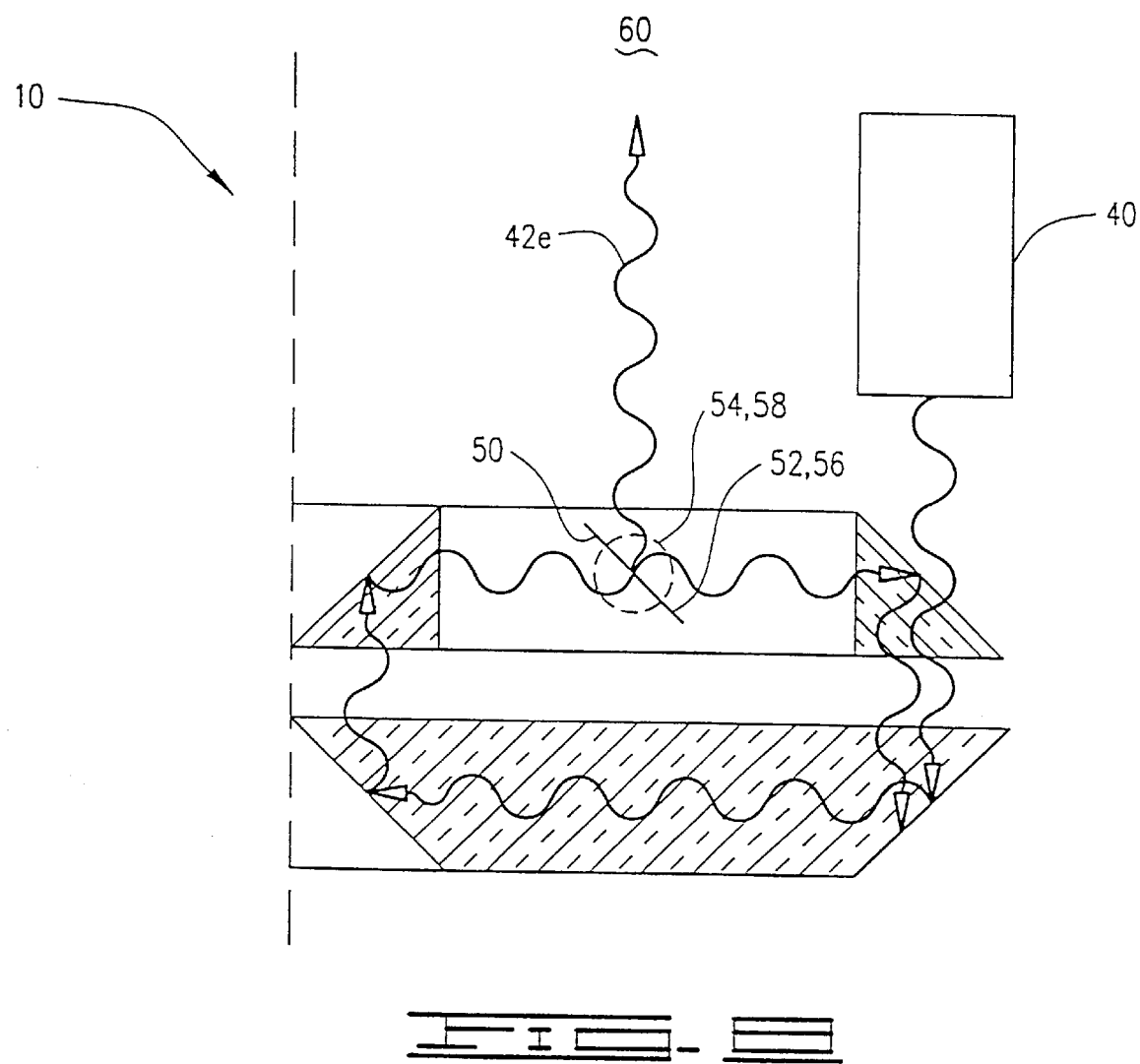
FIG. 8 is a schematic representation of the release means for releasing, in a burst of light, light energy trapped within the invention.

In operation a source of light, preferably a linear source of light such as a laser 40, is applied to the beveled periphery face 12. The light is refracted through the device, and contained therein through total internal refraction. That is, all of the light is maintained in the system, as shown in FIG. 8 of the drawings, a release means 50 is placed in the device between the first looping prism 22 and the second looping prism 26 to interrupt and re-route the light beam 42d, reflecting the light beam 42e to a location 60 outside the device 10. This release means 50 may include a mirror 52 and a mechanical system 54 for rapidly moving the mirror 52 between the first looping prism 22 and the second looping prism 26. Alternatively, the first looping prism 22, could be moved out of the light path, allowing light energy to escape. For example, the concentrated light energy could be directed for use similar to that of a laser, i.e., cutting or burning.

In another embodiment, also shown in FIG. 8 of the drawings, a liquid crystal display 56 could be disposed between the first looping prism 22 and the second looping prism 26, wherein the liquid crystal display is transparent in an unexcited state. When an electrical force 58 is applied to the liquid crystal display 56, the liquid crystal display 56 instantly becomes reflective, thus redirecting the light beam 42e from the device 10 in the same manner as the mirror 52.

Having thus described the field of the invention, the prior art, the attached drawings, the summary of the invention, and the detailed description of the preferred embodiments, I claim:

1. Circular prism light capacitor system receiving light from a light source for trapping light and later releasing it, comprising:
   a. a circular prism having a beveled periphery face, a beveled center face, an upper surface, and lower surface, and a center;
   b. a first looping prism having a first beveled face;
   c. a second looping prism having a second beveled face; and
   d. a light source,
whereby, the light emanating from the light source is refracted off of the beveled periphery face to the beveled center face, thence to the first beveled face, thence to the second beveled face and back to the beveled periphery face in a loop, such that the light from the light source is trapped in the system until it is released by a reflective or refractive surface placed in the path of the light.

2. The light capacitor of claim 1 where the first and second looping prisms are circular having a cross section matching the beveled center face and the beveled periphery face, respectively.

3. The light capacitor of claim 2 further including a release means for releasing, in a burst, light energy trapped in the capacitor.

4. The light capacitor of claim 3, the release means comprised of a mirror and a mechanical system for rapidly moving the mirror between two of the prisms.

5. The light capacitor of claim 3, the release means comprised of a liquid crystal display disposed between two of the prisms, the display being transparent until an electrical force is applied thereto, causing it to become reflective.

\* \* \* \* \*